United States Patent
Onuki et al.

(10) Patent No.: US 7,955,729 B2
(45) Date of Patent: Jun. 7, 2011

(54) VIBRATION RESISTANT SECONDARY BATTERY MODULE

(75) Inventors: Toshiaki Onuki, Fukaya (JP); Tunemi Aiba, Kiryu (JP); Takeyuki Goto, Hitachinaka (JP); Tatsuo Ono, Mitaka (JP)

(73) Assignee: Hitachi Vehicle Energy, Ltd., Ibaraki (JP)

( * ) Notice: Subject to any disclaimer, the term of this patent is extended or adjusted under 35 U.S.C. 154(b) by 586 days.

(21) Appl. No.: 11/696,597

(22) Filed: Apr. 4, 2007

(65) Prior Publication Data

US 2008/0057393 A1     Mar. 6, 2008

(30) Foreign Application Priority Data

Sep. 6, 2006    (JP) ................................. 2006-241314

(51) Int. Cl.
    *H01M 2/00*        (2006.01)
    *H01M 6/46*        (2006.01)

(52) U.S. Cl. ........................................ 429/163; 429/153

(58) Field of Classification Search ................. 429/159, 429/153, 149, 163, 175, 176, 96, 99, 100
See application file for complete search history.

(56) References Cited

U.S. PATENT DOCUMENTS

| | | | |
|---|---|---|---|
| 4,994,940 | A | 2/1991 | Thouvenin et al. |
| 5,667,908 | A * | 9/1997 | Stone .............................. 429/96 |
| 6,228,528 | B1 * | 5/2001 | Burkholder et al. .......... 429/163 |
| 6,761,992 | B1 * | 7/2004 | Marukawa et al. ............. 429/96 |
| 2005/0095499 | A1 * | 5/2005 | Kanai et al. ..................... 429/83 |
| 2006/0154053 | A1 * | 7/2006 | Cain et al. ..................... 428/343 |
| 2008/0124622 | A1 * | 5/2008 | Hamada et al. ............... 429/149 |

FOREIGN PATENT DOCUMENTS

CN           2359804 Y      1/2000
(Continued)

OTHER PUBLICATIONS

Chinese Office Action from corresponding Chinese Patent Application No. 200710091390.8.

(Continued)

*Primary Examiner* — Dah-Wei D Yuan
*Assistant Examiner* — Stephan Essex
(74) *Attorney, Agent, or Firm* — Roberts Mlotkowski Safran & Cole P.C.

(57) ABSTRACT

The present invention provides a secondary battery module which is excellent in vibration resistance. A battery module 20 has assembled battery blocks 11 each constituted by screw-fixing the assembled batteries 2 to the block bases 3, 4 supporting a lower portion thereof and the two block reinforcing plates 5 supporting an upper portion thereof, the six assembled batteries 2 are sandwiched by and fixed firmly to the block bases 3, 4 and the block reinforcing plates 5. The assembled batteries 2 do not move freely even if vibration is added to the battery module 20. Because the elastic sheet 9 is laid between the block bases 3, 4 and the assembled batteries 2, since a space derived due to variance in size accuracy of frames 12 which hold and fix the unit cells 11 and derived due to variance in size accuracy of the block bases 3, 4 can be removed, and vibration resistance can be enhanced. To thermal stress change caused due to combination of different materials, influence thereof can be reduced by laying the elastic sheet 9.

9 Claims, 6 Drawing Sheets

FOREIGN PATENT DOCUMENTS

| | | | |
|---|---|---|---|
| CN | 1691364 | A | 11/2005 |
| EP | 0 362 083 | A1 | 4/1990 |
| EP | 0 952 620 | A1 | 10/1999 |
| JP | 63-164159 | A | 7/1988 |
| JP | 11-45691 | A | 2/1999 |
| JP | 2000-182583 | A | 6/2000 |
| JP | 2001-155702 | A | 6/2001 |
| JP | 2002-141114 | A | 5/2002 |
| JP | 2004-71394 | A | 3/2004 |
| WO | 2006/059421 | A1 | 6/2006 |
| WO | 2006/087962 | A1 | 8/2006 |
| WO | WO 2006087962 | A1 * | 8/2006 |

OTHER PUBLICATIONS

European Search Report from corresponding European Patent Application No. EP 07 10 5739.

Office Action dated Nov. 25, 2008 issued by the Japanese Patent Office in corresponding Japanese Patent Application No. 2006-241314.

Office Action dated Apr. 10, 2009 issued by the State Intellectual Property Office of China in corresponding Chinese Patent Application No. 200710091390.8.

Office Action dated Mar. 27, 2010 issued by the Korean Intellectual Property Office in corresponding Korean Patent Application No. 2007-0031048.

* cited by examiner

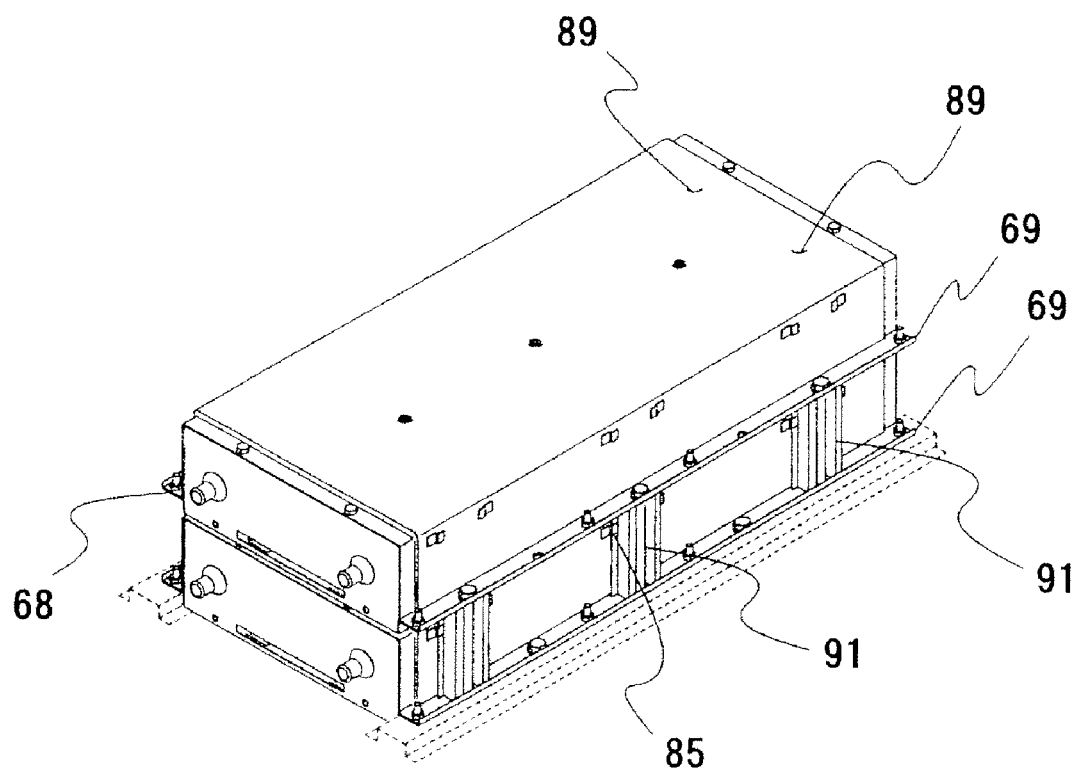

VIBRATION RESISTANT SECONDARY BATTERY MODULE

FIELD OF THE INVENTION

The present invention relates to a secondary battery module, and in particular to a secondary battery module comprising a battery block that a plurality of unit cell groups is disposed adjacently.

DESCRIPTION OF THE RELATED ART

A battery power supply apparatus using secondary batteries is structured to have high voltage or high capacity by connecting a plurality of unit cells electrically in series or rows. In order to realize such serial or parallel connection, a technique that a bus bar which is a conductive member is welded to a unit cell, or a technique that a screw portion manufactured in advance is formed respectively at positive and negative electrodes positioned at unit cell ends or a conductive material having the screw portion manufactured in advance is welded or connected to respective of positive and negative electrodes positioned at unit cell ends to fasten the bus bar to the screw portion, has been disclosed. Incidentally, in a unit cell of which metal container as a whole has one polarity (ex. polarity of negative electrode), a surface of the metal container is covered by a thermal shrink tube, an insulating membrane or the like.

Grouped cells electrically connected in the above manner are fixed by holding with frames having insulation to constitute a unit cell group (assembled battery). A secondary battery module that the unit cell groups are disposed adjacently and the conductive member is disposed between the unit cell groups next to each other to secure high voltage or high capacity has been invented (ex. JP-A-2000-182583).

For example, in a case that it is necessary to supply high power like an electric source for a vehicle, the total number of unit cells reaches to several tens. Work for connecting the several tens unit cells in series with the conductive members requests a lot of man-hours, which makes the electric source costly in view of preventing short cuts. Further, in a case that a lithium ion battery which has high capacity-volume-density is used for the unit cell, it is necessary to connect wires for detecting voltage of each unit cell and for controlling capacity of each unit cell. Connecting work thereof is also complicated.

In order to reduce the number of these conductive members, it is preferable to weld directly or deform plastically the conductive members which connect unit cells such as bus bars. But, when one of the connected unit cells has some trouble, all of the connected several tens of unit cells become inferior goods. If the above stated screw connecting method that electric connection is allowed in a plurality of times is applied to the conductive materials, only the unit cell which caused the trouble can be replaced. However, because this method increases the number of parts, it causes problems of parts cost, manufacturing cost, weight increase and the like.

Further, in a case of a power supply for a movable or mobile body such as a vehicle or the like, vibration resistance is required to a connecting part between the unit cell and the conductive member, a connecting part of voltage detecting members, a fixing part of the unit cell per se or the unit cell group per se, a connecting part of the conductive member or the voltage detecting member. This vibration resistance requires retaining respective of the part shapes in using environments.

Especially, in a power supply for vehicle use, environments vary largely according to the using district, season or the like. Accordingly, the battery module, an aggregate of various members such as a metal container which constitutes an exterior of the unit cell, the conductive member, an insulation frame which holds and fixes these, or the like, is required to have endurance against not only external stress such as vibration and the like but also thermal stress derived from the differences in these rates of expansion.

On the other hand, parts manufactured industrially per se have size variance. Thus, a space between parts is subject to receiving influence of vibration, which may cause a problem of destruction of connecting parts, stop of power supply due to destruction of insulation parts, generation of heat or catching of fire due to a short circuit, or the like.

Incidentally, since the battery module which accommodates many unit cells requires to eliminate effectively the heat generation at the charging or discharging time which is an actual using time, a space between each of the unit cells must be formed and cooling air has to be passed through the space. Further, a problem of recycling (disassembling of the battery module) which is in general more complicated than assembling be also considered.

SUMMARY OF THE INVENTION

In view of the above circumstances, an object of the present invention is to provide a secondary battery module which is excellent in vibration resistance.

In order to achieve the above object, the present invention is to provide a secondary battery module comprising a battery block that a plurality of unit cell groups is disposed adjacently, wherein the battery block holds and fixes the unit cell groups by two channel shaped block bases which support a lower portion of the unit cell groups and two channel shaped block reinforcing plates which hold an upper portion of the unit cell groups, and wherein an elastic body is laid between the block bases and the unit cell groups.

According to the present invention, since the unit cell groups are held and fixed by two channel shaped block bases which support a lower portion thereof and two channel shaped block reinforcing plates which hold an upper portion thereof, the unit cell groups do not move freely even if vibration is added to the battery block; and since an elastic body is laid between the block bases and the unit cell groups, a space derived due to variance in size accuracy of frames which hold and fix the unit cells and derived due to variance in size accuracy of the block bases can be removed, thereby vibration resistance is enhanced.

In the present invention, it is preferable that a surface of the elastic body has adhesion, and the elastic body may be an elastic adhesive substance which adhered and solidified between the block bases and the unit cell groups.

BRIEF DESCRIPTION OF THE DRAWINGS

FIG. 8 is an appearance perspective view in a case that the battery modules are used in a stacked manner.

DETAILED DESCRIPTION OF THE PREFERRED EMBODIMENTS

With reference to the drawings, an embodiment where the present invention is applied to a secondary battery module for an electric vehicle will be explained below.

(Constitution)

Figure 1:
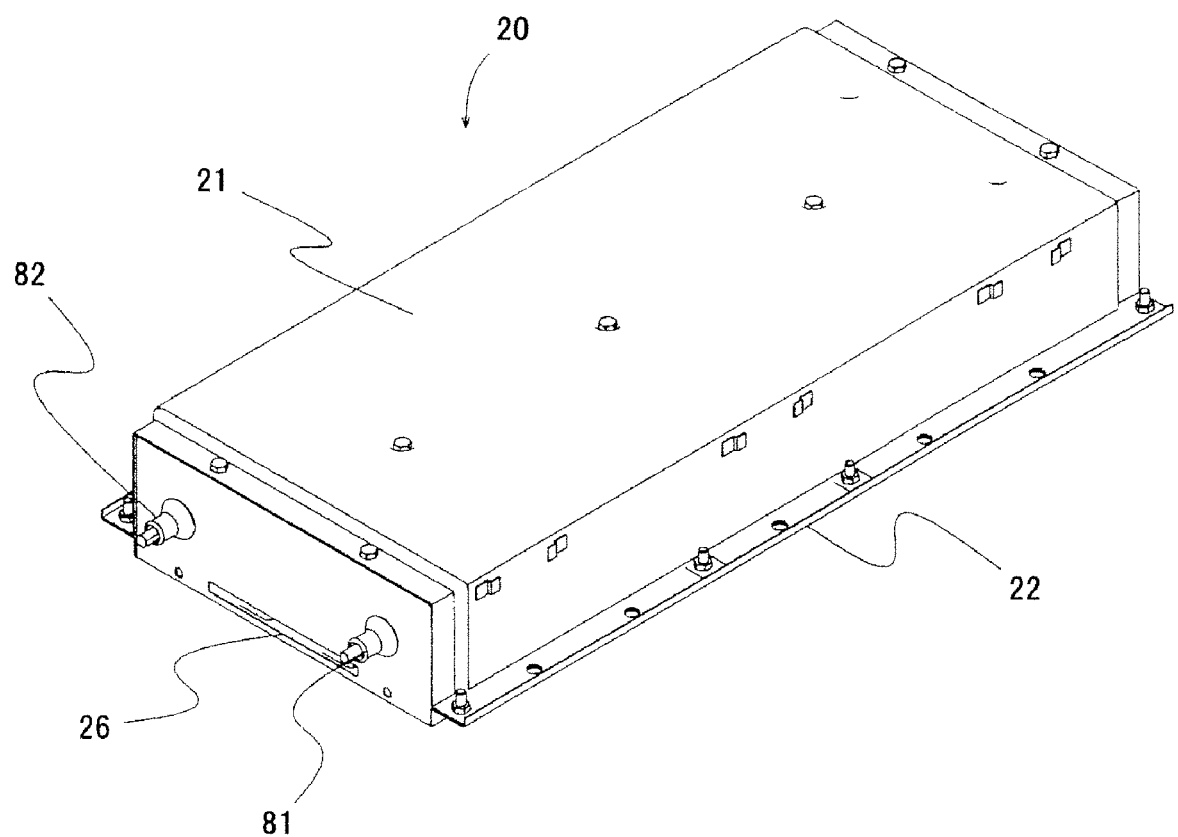
FIG. 1 is an appearance perspective view of a battery module according to an embodiment to which the present invention can be applied.
Figure 2:
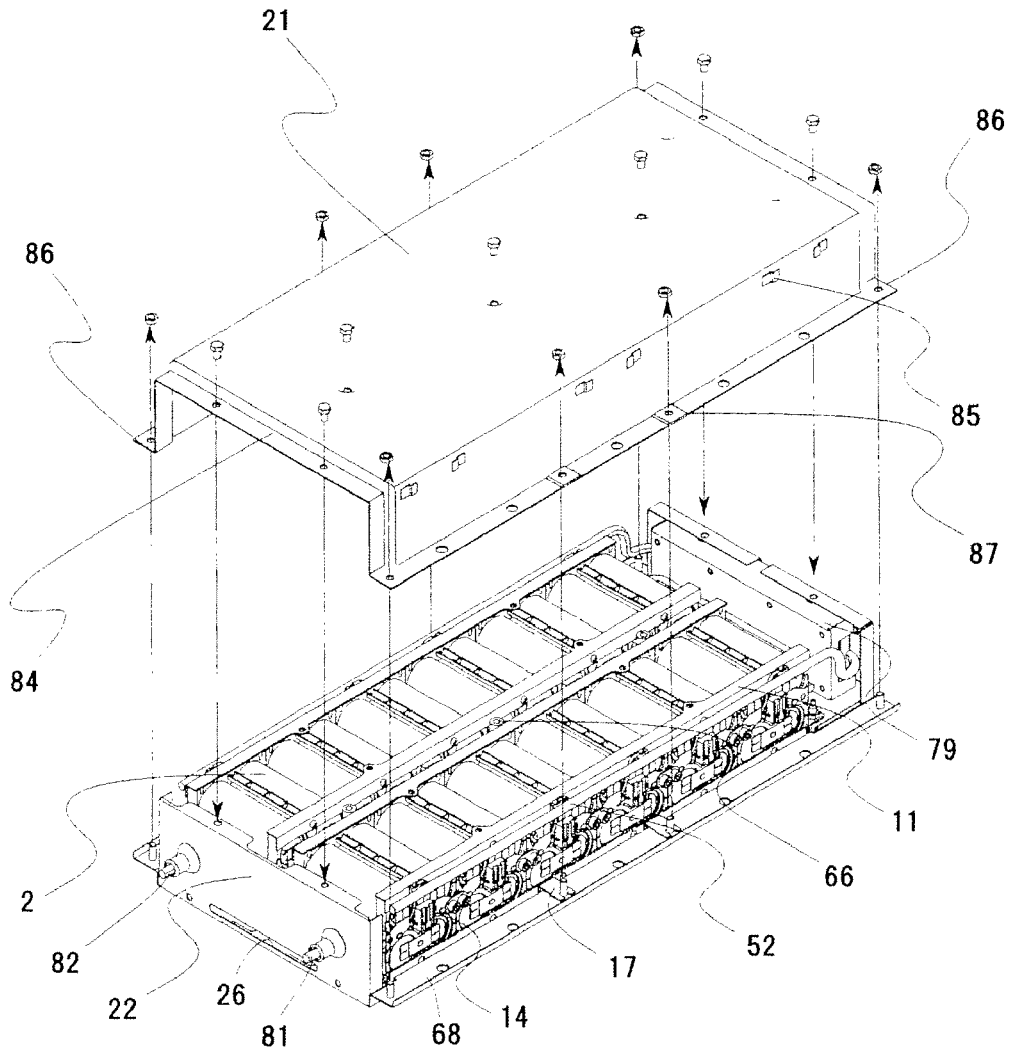
FIG. 2 is a perspective view showing an assembled state of an upper lid of the battery module in the embodiment.

As shown in FIG. 1 and FIG. 2, a battery module 20 in this embodiment is provided with an exterior case formed in an approximately hexahedral shape made of metal and composed of an upper lid 21 and a lower lid 22. A plurality of assembled batteries 2, each being served as a unit cell group, are accommodated and fixed in the exterior case. There are wires (lines) for detecting voltages of unit cells which constitute the assembled battery 2 and a controlling circuit in the exterior case. These parts are protected by the exterior case from external electric noises.

<Assembled Battery>

Figure 3:
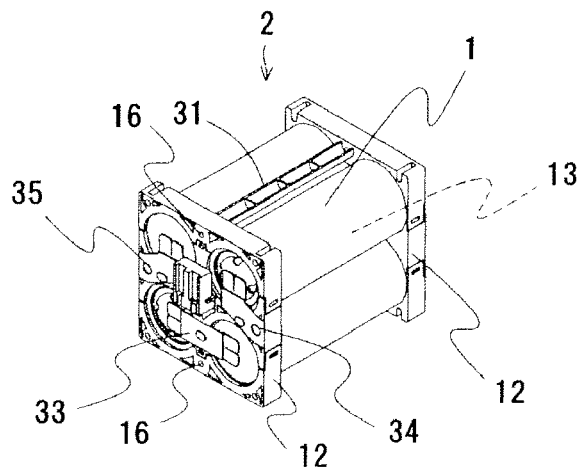
FIG. 3 is an appearance perspective view of an assembled battery.

In the assembled battery 2, as shown in FIG. 3, a plurality of unit cells 1 are arranged in two rows and two columns such that their polarities become alternate and the plurality of the unit cells 1, preferably 4 unit cells 1 are connected in series. There are various shapes of unit cells, but in this embodiment, a cylindrical lithium ion secondary battery formed by covering lithium manganese complex oxide for positive electrode active material and amorphous carbon for negative electrode active material with a metal casing having high heat conductivity and by further covering a circumferential face of the casing with a thermal shrink cube 13 is used.

In this embodiment, the unit cells 1 are unified as the assembled battery 2 having a positional relationship that respective of side faces thereof are facing with each other and the assembled batteries 2 are fixed in the external case in a manner that ends of the unit cells in the assembled batteries 2 are facing with each other.

As shown in FIG. 3, the assembled battery 2 is constituted such that the unit cells 1 are sandwiched from a vertical direction to their circumferential directions by two resin made frames 12 which are resin-molded products having high electric insulation, and the four unit cells 1 are electrically connected by a metal bus bar in series by welding. Voltage detecting wires 14 (see FIG. 2) for detecting and regulating voltages of individual unit cells 1 are connected to the assembled battery unit 2. The bus bars for connection are put together to one frame 12 (left side frame shown in FIG. 3) via an unillustrated flexible base board which constitutes the voltage detecting wires 14 and the bus bars for connection and the unillustrated flexible base board are connected in advance before assembling of the assembled battery 2 in order to improve assemble work. Namely, a plurality of conductive wires (lines) which constitute the voltage detecting wires 14 are printed and covered thereon on the flexible base board, one ends of the conductive wires are respectively connected to the bus bars, and another ends are put together to a connector.

Arch shaped louvers 31 each having an approximate U-shape in section that defines distance between the frames 12 and allows flow of cooling air to outer peripheral faces of the unit cells 1 are disposed at upper and lower two portions between the frames 12. Further, a cross shaped louver 32 having a cross shape in section that defines distance between the frames 12 and allows flow of cooling air to inner peripheral faces of the unit cells 1 is disposed at a center between the frames 12 (see FIG. 7). Incidentally, a part of the flexible base board is fixed to the cross shaped louver 31 along a longitudinal direction thereof up to another frame 12 (right side frame in FIG. 3) opposing to the one frame 12 to which the connector is fixed.

An inter-unit cell bus bar 33 for connecting between the unit cells 1, a positive electrode bus bar 34 for positive electrode output, and a negative electrode bus bar 35 for negative electrode output are inserted into one frame 12, and nuts for screw fastening to the positive electrode bus bar 34 and the negative electrode bus bar 35 are further inserted into the frame 12. Two inter-cell bus bars are inserted into another frame 12 in a direction orthogonal to the inter-unit cell bus bar 33. Accordingly, the assembled battery 3 that four unit cells 1 are connected in series can be constituted by spot-welding these bus bars and the unit cells 1. Incidentally, assembled battery fixing portions 16 (female screws) for fixing the assembled battery 2 are formed at upper and lower two portions in each frame 12.

<Assembled Battery Block>

Figure 4:
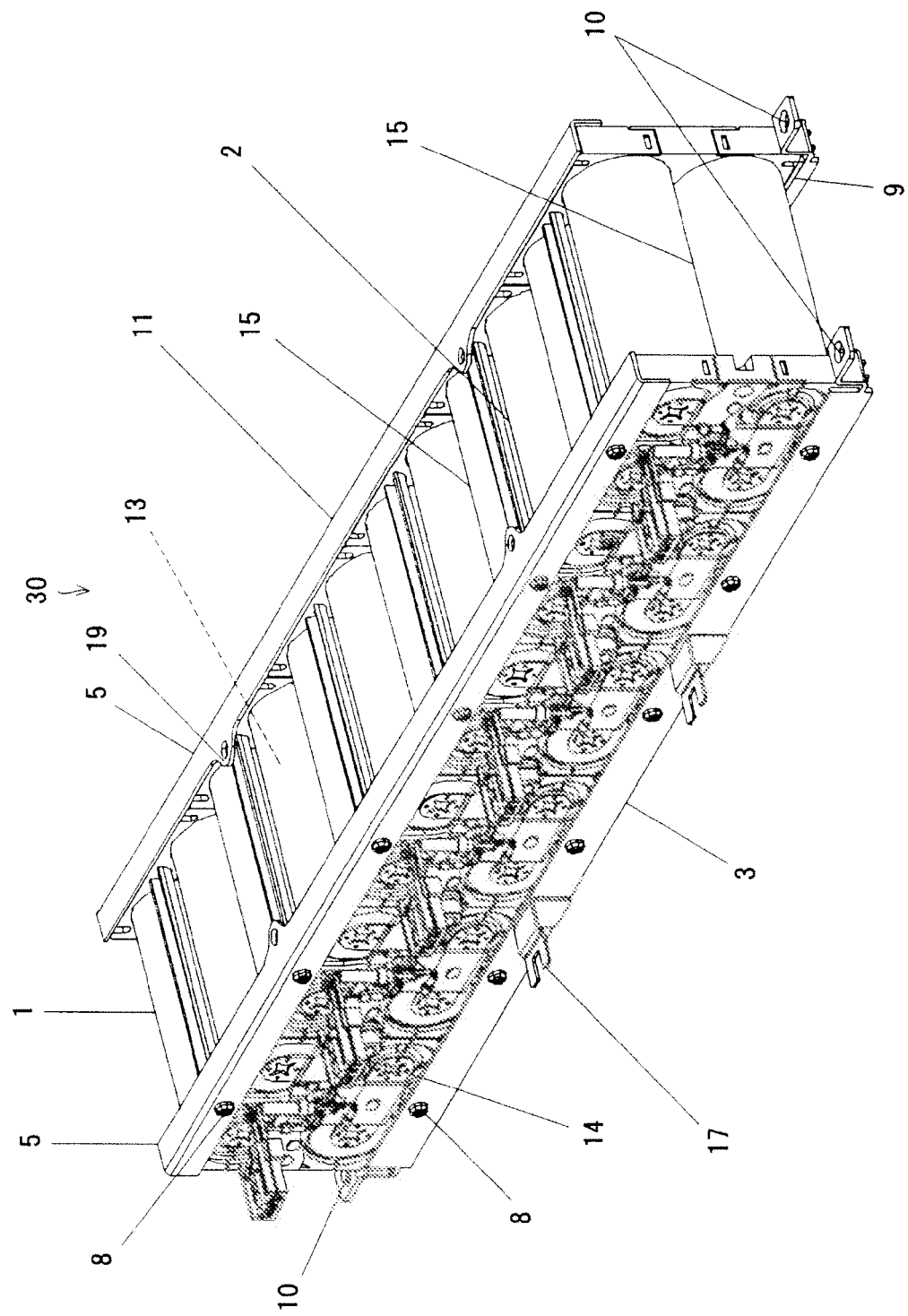
FIG. 4 is an appearance perspective view of an assembled battery block.
Figure 5:
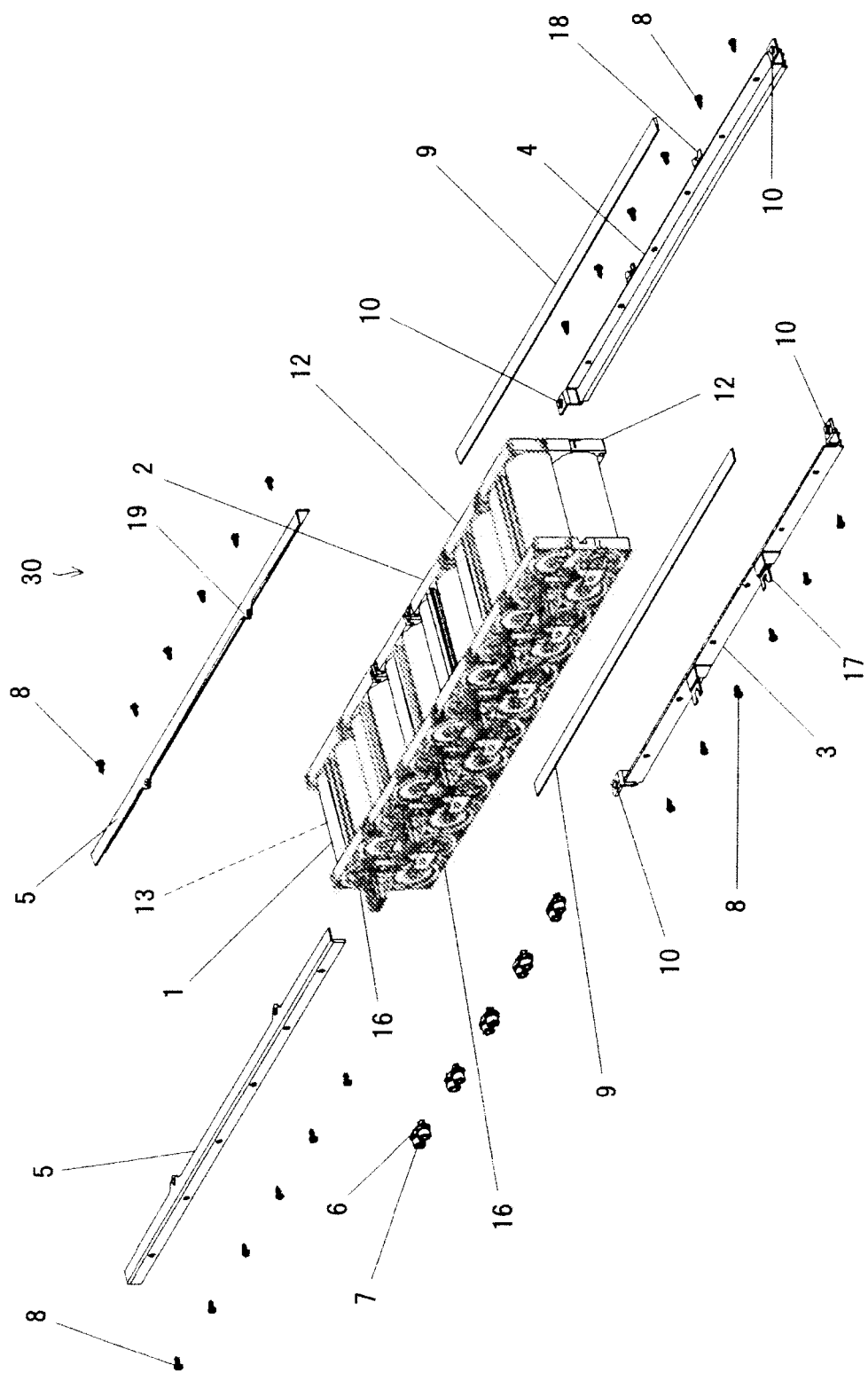
FIG. 5 is an exploded perspective view of the assembled battery block.

In the embodiment, as shown in FIG. 4 and FIG. 5, a plurality of assembled batteries 2 (six assembled batteries 2 in this embodiment) are disposed on two channel shaped block bases 3, 4 each having an approximate L shape in section and being disposed to be opposed to each other, respectively via an elastic sheet 9 that has a long and narrow strip shape, that adhesive is disposed at one face (a side of block bases 3, 4) and that serves as an elastic body, they are fixed by fixing screws (tapping screws) 8 screwed at the fixing portions 16 (female screws), and an assembled battery block 11 being served as a battery block is assembled by connecting the negative bus bars 35 and the positive bus bars 34 of adjacent assembled battery units 2 to each other in series with inter-assembled battery bus bar 6 fixed by cap bolts 7 in order to improve assembling easiness and handling easiness of the battery module 20.

As shown in FIG. 2 and FIG. 5, the block bases 3, 4, each has a plurality of flange portions extending laterally for fixing the assembled battery block 11 to the lower lid 22 laterally. There are two kinds of flanges; for the sake of convenience, the flanges disposed at an outside of the battery module 20 are referred to as block flanges A 17, while the flanges disposed at an inside of the battery module 20 are referred to as block flanges B 18. In other words, when a face positioned outside the battery module 20 is defined as a face on which the connector of the assembled battery 2 is fixed, the block flanges A 17 are disposed on the block base 3 having this face. The block flanges A 17 are sandwiched between the lower lid 22 and the upper lid 21 and the block base 3 is also fastened and fixed simultaneously with fastening of the lower lid 22 and the upper lid 21. Fixing screw holes 10 for fixing the assembled battery block 11 from a front face side and a rear face side are formed at both ends in a longitudinal direction of the block base 3, 4.

As shown in FIG. 5, channel shaped block reinforcing plates 5 with an approximate L shape in section are arranged above the assembled battery block 11 in parallel with the bock bases 3, 4. The fixing portions 16 of the assembled battery 2 are fixed to the block reinforcing plates 5 by fixing screws 8 laterally. A voltage detecting harness 52 connected to the voltage detecting wires 14 of the respective assembled batteries 2 constituting the assembled battery block 11 is fixed to the block reinforcing plate 5 on the face side that the connector is fixed. That is, a cable tie for attaching a banding band is attached to the block reinforcing plate 5 by the fixing screws 8, and the voltage detecting harness 52 is fixed to the block reinforcing plate 5 with the banding band. The block reinforcing plates 5 are curved at two portions to have two block reinforcing portion curved portions 19 with a circular hole.

<Battery Module>

Figure 6:
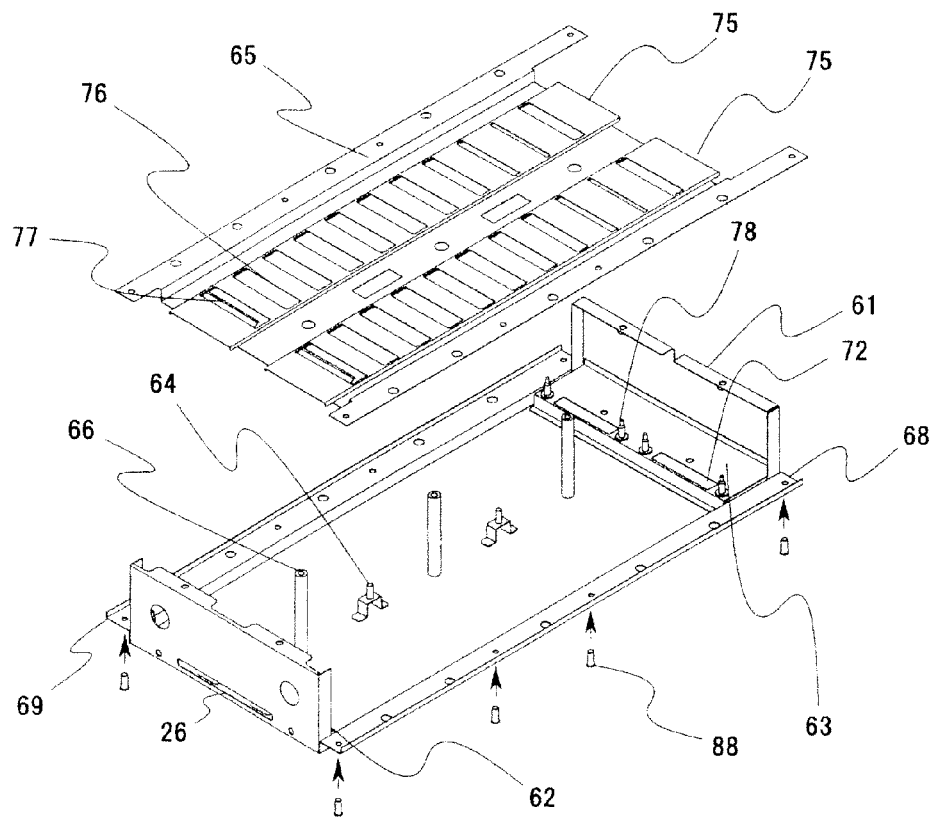
FIG. 6 is an exploded perspective view of parts constituting a lower lid of the battery module.

As shown in FIG. 6, the lower lid 22 is composed of six kinds of parts of a lower lid base 61, an (cooling air) introduction side fixing stand 62, a (cooling air) discharge side fixing stand 63, block fixing stands 64, a reinforcing louver 65, and center poles 66.

The lower lid base 61 constitutes a front face, a bottom face, and a rear face of the external case. A front face portion of the lower lid base 61 is formed at its central both sides with circular holes for taking out a positive electrode power cable 81 and a negative electrode power cable 82 (see FIG. 2), and is formed at its lower portion with a slit-like intake opening 26 for introducing cooling air. An upper face side and left and right side face side end portions of the front face portion of the lower lid base 61 are bent in an L shape. On the other hand, a rear face portion of the lower lid base 61 is formed with a slit-like outlet opening 27 for discharging cooling air at a position corresponding to the intake opening 26 formed at the front face portion (see FIG. 7). Lower lid flange portions 68 with an approximately horizontal face serving as first flange portions extend from a bottom face portion of the lower lid base 61 toward left and right lateral directions so as to position above the bottom face of the lower lid base 61. A bent rib 69 bent upwardly is formed at each end portion of the lower lid flange portions 68.

Figure 7:
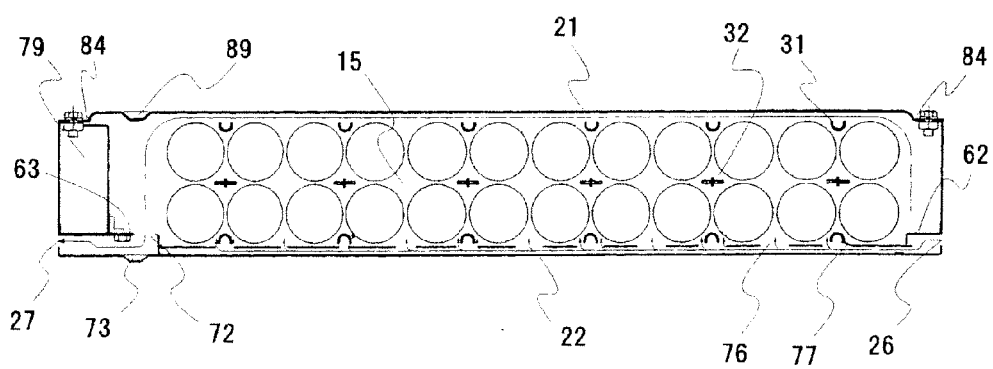
FIG. 7 is a schematic sectional view of the battery module illustratively showing flow passage of cooling air.

The introduction side fixing stand 62 for fixing the block bases 3, 4 of the assembled battery block 11 from the front side and guiding cooling air introduced from the intake opening 26 to the reinforcing louver 65 is fixed to the bottom portion of the lower lid base 61 on the front face side (also see FIG. 7). On other hand, the discharge side fixing stand 63 for fixing the block bases 3, 4 of the assembled battery block 11 from the rear side and guiding cooling air which has passed through the battery module 20 via cooling air circulating path 15 (see FIG. 4) formed between the unit cells 1 to the outlet opening 27 via two discharge ports 72 formed in an upper face thereof is fixed to the bottom face portion of the lower lid base 61 on the rear face portion side (also see FIG. 7). The center poles 66 for supporting a central portion of the upper lid 21 in the longitudinal direction and for coupling (screw-fastening) to the upper lid 21 and the block fixing stands 64 for fixing the block flanges B 18 of the block base 4 of the assembled battery block 30 are alternately fixed at a central portion of the bottom base portion along the longitudinal direction of the bottom face portion of the lower lid base 61.

The reinforcing louver 65 for reinforcing bottom face strength of the lower lid base 61 and supplying cooling air for each assembled battery block 11 is fixed on the lower lid base 61. The center of the reinforcing louver 65 in a longitudinal direction thereof abuts on the bottom face portion of the lower lid base 61 and it is formed with circular holes and rectangular holes which allow insertions of the center poles 66 and the block fixing stands 64 fixed on the lower lid base 61. Both sides of the center of the reinforcing louver 65 in the longitudinal direction are made high in a stepped manner (hereinafter, called "a duct formation portion"), so that ducts 75 with a rectangular opening section are formed in cooperation with the lower lid base 61. Rectangular ventilation ports 76 are formed in the duct formation portion at portions corresponding to between respective adjacent unit cells 1 which constitute the assembled batteries 2, namely, the cooling air circulating path 15 (also see FIG. 7). About one half of an opening area of the ventilation port nearest the intake opening 26 is covered with a slanting rib-like shielding louver 77.

Both lateral sides of the duct formation portion of the reinforcing louver 65 abut on the bottom face portion of the lower lid base 61 like the central portion in the longitudinal direction. Both lateral side portions of the reinforcing louver 65 are erected and flange portions with an approximately horizontal face extend therefrom laterally toward the left and the right directions. The flange portions of the reinforcing louver 65 are caused to plane-contact with the lower lid flange portions 68 of the lower lid base 61 to be fixed thereto. The reinforcing louver 65 is notched at the front face and rear face sides so as to avoid positions of the introduction side fixing stand 62 and the discharge side fixing stand 63 fixed to the lower lid base 61. Incidentally, an end portion of the duct formation portion of the reinforcing louver 65 on the side of the introduction side fixing stand 62 is inserted in the introduction side fixing stand 62 so as the ducts 75 to communicate with the intake opening 26 (also see FIG. 7).

As shown in FIG. 2 and FIG. 6, two assembled battery blocks 11 are fixed in parallel on the lower lid 22. That is, stud bolts 78 provided on the induction side fixing stand 62 and the discharge side fixing stand 63 in a standing manner are inserted into the fixing screw holes 10 of the block bases 3, 4 of the each assembled battery block 11 at both the ends and the bolts are fixed by spring-assembled nuts. The block flanges B 18 of the block bases 4 of the assembled battery blocks 11 are also fixed on the block fixing stands 64 by spring-assembled nuts so as to be superimposed with each other.

A cell controller (C/C) box 79 accommodated a C/C is screw-fixed to the lower lid base 61 on the discharge side fixing stand 63. The C/C has a rectangular shape and is constituted by one base board where wiring is printed on both sides and microcomputers and the like are mounted. The C/C is fixed in an electing state within the C/C box 79 by screws via a plurality of round holes formed at upper and lower sides thereof.

Connecting connectors are disposed at both left and right ends of the base board which constitutes the C/C and a harness connector fitted at one end of the voltage detecting harness 52 is connected to the connecting connector of the C/C. Incidentally, the voltage detecting harness 52 is drawn from each assembled battery block 11, the harness connector for connecting with the C/C is disposed at one end thereof, and six connecting connectors for connecting six assembled batteries 2 respectively are disposed at another end thereof.

As shown in FIG. 2, the upper lid 21 constitutes a left side face, an upper face, and a right side face of the interior case. Upper lid drawn portions 84 formed by drawing the front face and rear face sides are formed at the upper lid 21. In other words, both end portions of the left side face, the upper face, and the right face side are bent toward the front face portion and the rear face portion of the lower lid base 61 to be narrowed down in order to increase bearing force of the whole exterior case against a twisting direction. Collar guides 85 for restricting movement of a collar 91 (see FIG. 8) are welded on the left and right side faces of the upper lid 21 in order to prepare for a case that the battery modules 20 are used in a stacked manner via the collars 91. Incidentally, because convex shaped lower lid protrusions 73 are disposed at the lower lid 22 and dent shaped upper lid recesses 89 are formed at the upper lid 21 (see FIG. 7), positioning in the case that the battery modules 20 are used in a stacked manner can be made easily. Upper lid flange portions 86 with an approximately horizontal face serving as second flange portions extend from left and right sides of the upper lid 21. Flange portion recesses

87 are formed on the upper flange portions 83 such that they avoid the block flanges A 17 extending from the block base 3 that have ridden on the lower lid flange portion 68.

The lower lid flange portions 68 and the upper lid flange portions 86 are screw-fastened to each other by stud bolts. The upper lid drawn portions 84, and the front face portion and the rear face portion of the lower lid base 61 are screw-fastened. Since a step portion is formed between the upper face of the upper lid 21 and the upper lid drawn portion 84, screw heads fastened do not project above the upper face of the upper lid 22 (also see FIG. 1). Female screws are formed on top portions of the center poles 66 provided on the lower lid base 61 in a standing manner, so that the upper lid 21 and the lower lid 22 are also screw-fastened to each other at these portions.

<Cooling System of Battery Module>

As shown in FIG. 7, the cooling system for the battery module 20 has a structure that cooling air introduced from the intake opening 26 passes through inside of the introduction side fixing stand 62 of the lower lid 22, flows through ducts formed between the reinforcing louver 65 and the lower lid base 61 and corresponding to respective of assembled battery blocks 11 to pass through respective ventilation holes 76 formed in (the duct formation portion of) the reinforcing louver 65, reaches a space formed between the unit cells 1 and the upper lid 1 while turning around each of the peripheries of the unit cells 1 which constitute each assembled battery 2 via the cooling air circulating path 15, and passes through below the C/C box 79 via the discharge port 72 formed on the upper face of the discharge side fixing stand 63 to flow to the outside from the outlet opening 27.

The arch shaped louvers 31 and the cross shaped louvers 32 have functions of columns between the two frames 12 which constitute the assembled battery 2 and of inner louvers. Here, an important point in cooling the unit cells 1 lies in positions and opening areas of the ventilation holes 76 formed in the reinforcing louver 65. In this embodiment, the shielding louver 77 is provided to the ventilation hole 76 nearest the cooling air introduction side, and the opening areas of the ventilation holes 76 are reduced according to separation from the cooling air introduction side, and an area of the ventilation hole 76 nearest the air discharge side is made large.

Since cooling air which has heat-exchanged by forcible cooling is concentrated at the discharge side, a satisfactory result can be achieved by not only reducing the opening areas of the ventilation holes 76 to increase a flow rate but also exposing the unit cells to a large amount of cooling air with reduced temperature. For example, when the ratio of the opening area of the ventilation hole 76 at the central portion is defined as 1.0, the ratios of the opening areas are set to 0.7, 0.25, 0.4, 0.7, 0.8, 1.0, 1.0, 1.0, 1.0, and 0.65 from the discharge side, so that an optimal cooling system can be obtained.

(Assembling Procedure)

Next, an assembling procedure of the battery module 9 according to the embodiment will be explained in the order of the assembled battery 2, the assembled battery block 11, and the battery module 9 step by step.

<Assembling Procedure of Assembled Battery 2>

Adhesive is applied to the curved portions of the frames 12 contacting with the unit cells 1, and the unit cells 1 are disposed thereon so that their polarities are alternate. Then, the frames 12 are pushed to function snap fit provided between the cross shaped louver 3 which is a column provided between the frame 12 and the frame 12. Next, the metal bus bars inserted into the frames 12 and each of the unit cells 1 are spot-welded. Incidentally, final fixing between the unit cells 1 and the frames 12 depends on the adhesive, but a structure that physical constraint force due to the snap fit can retain the unit cells 1 inside the frames 12 until the adhesive is dried and solidified is employed in this embodiment.

Because the voltage detecting wires 14 are put together to the connector via the unillustrated flexible base board (the connector is disposed at one end of the flexible base board), a structure is employed that the voltage detecting wires are put together to the connector only by spot-welding the unit cells 1 to the bus bars. The connector is fixed in advance to the one frame 12. Accordingly, connecting work of the voltage detecting wires 14 can be remarkably simplified.

<Assembling Procedure of Assembled Battery Block 11>

As shown in FIG. 4 and FIG. 5, the two block bases 3, 4 are disposed in parallel to face each other, and the elastic sheet 9 is disposed on the block bases 3, 4, respectively, then the assembled batteries 2 are disposed thereon to fix them to the block bases 3, 4 with the fixing screws 8. After the assembled batteries 2 are fixed to the block bases 3, 4, the block reinforcing plates 5 are arranged on the assembled batteries 2, and they are fixed by fixing screws 8 like the case of the block bases 3, 4. Thus, four corners in a vertical direction of the six assembled batteries 2 are sandwiched by the block bases 3, 4 and the block reinforcing plates 5 to be firmly fixed to them. At this time, cable ties for attaching the banding bands are attached at four portions on the face on which the voltage detecting wires 14 are installed by the fixing screws 8 (see FIG. 2). Thereafter, the voltage detecting harness 52 is disposed in the vicinity of the cable tie and it is fixed to the assembled battery block 11 by the banding bands. Then, the six connecting connectors provided at another side (opposite side of the harness connector) of the voltage detecting harness 52 are inserted (connected) into each of the connectors of the six assembled batteries which constitute the assembled battery block 11, thereby the assembling of the assembled battery block 11 is finished.

<Assembling Procedure of Battery Module 3>

As shown in FIG. 2 and FIG. 6, the assembled battery blocks 11 are arranged and fixed on the lower lid 22. At this time, handling of the assembled battery block 11 such as carrying thereof is performed by inserting hooks made of a thick wire into the circular holes of the block reinforcing plate curved portions 19 of the block reinforcing plates 5. The assembled battery block 11 is fixed by inserting the stud bolts 78 of the introduction side fixing stand 62 and the discharge side fixing stand 63 constituting the lower lid 22 into the fixing screw holes 10 formed at both ends of the block bases 3, 4 of the assembled battery block 11 and fastening the nuts to the stud bolts 78. After two assembled battery blocks 11 are fixed in parallel, it is confirmed that the block flanges B 18 extending from the block bases 4 of the assembled battery blocks 11 are superimposed on the block fixing stand 64 and the block bases 4 are fastened by the spring-assembled nuts.

After fastening of the assembled blocks 11 is terminated, the C/C box 79 housed the C/C is inserted between the assembled battery blocks 11 on the discharge side fixing stand 63 of the lower lid 22 and the lower lid 22, and the connectors at the distal ends of the voltage detecting harness 52 (two drawn as shown in FIG. 2) and the connectors on the C/C are connected to each other. Thereafter, the C/C box 79 is slid to the wall side of the back face of the lower lid 22 to be pressed thereto, and it is fastened by screws from the outside of the battery module 20. The C/C box 79 is fixed at four fixing points, that is, the fixation is performed by lateral fixations from the back face of the lower lid 22 and upward fixations to welding nut portions provided on the discharge side fixing stand 63. A play or clearance corresponding to an insertion stroke of the connector is required on the side of the voltage detecting harness 52 in order to fasten the connectors to each other, but adopting such a constitution results in excessive elongation of the harness. A required play can be suppressed to the minimum by connecting the connectors in a free stage where the C/C box 79 is not fixed yet.

Inter-block connecting bus bar for conducting electric connection between the assembled battery blocks 11 is fastened by mounting screws, and the positive electrode power cable 81 with a grommet and the negative electrode power cable 82 with a grommet fixed to the lower lid 22 in advance are connected to the respective assembled battery blocks 11 and fastened thereto using screws. Since crimping terminals are connected to terminal ends of the power cables, attaching of the power cables can be performed simply.

After all the electric connections have been completed, the upper lid 21 is placed on the lower lid 22 and the lower lid 22 and the upper lid 21 are fastened (combined) by individual screws. That is, the stud bolt 88 provided on the lower lid flange portions 68 of the lower lid 22 in a standing manner and the circular holes formed in the upper lid flange portion 86 of the upper lid 21 are fastened by screws. At this time, the block flanges A 17 extending form the block base 3 are put on the lower lid flange portion 68, the upper lid 21 and the lower lid 22 are fastened on the flange portion recesses 87, and the assembled battery block is also fastened. Assembling of the battery module 20 is completed by screw-fastening the lower lid 22 at the upper lid drawn portions 84 and screw-fastening the upper face of the upper lid 21 and he center poles 66.

(Effects and the Like)

Next, effects of the battery module 20 according to this embodiment and the like will be explained.

In the battery module 20 according to this embodiment, by screw-fixing each of the assembled batteries 2 to the block bases 3, 4 which support a lower portion thereof and the two block reinforcing plates 5 which support an upper portion thereof at four portions, the six assembled batteries 2 are sandwiched by and fixed firmly to the block bases 3, 4 and the block reinforcing plates 5 to constitute the assembled battery block 11, and the assembled battery block 11 is fixed to the exterior case. Thus, not only the assembled batteries 2 but also each of the unit cells 1 do not move freely even if vibration is added to the battery module 20. Further, since the elastic sheet 9 is laid between the block bases 3, 4 and the assembled batteries 2, a space derived due to variance in size accuracy of frames 12 which hold and fix the unit cells 11 and derived due to variance in size accuracy of the block bases 3, 4 can be removed. Accordingly, vibration resistance of the battery module 20 can be enhanced.

Further, in the battery module 20 according to this embodiment, to thermal stress change caused due to combination of different materials such as resin made frames 12 and metal made block bases 3, 4, influence thereof can be reduced by intervening the elastic sheet 9 between the block bases 3, 4 and the assembled batteries 2. Accordingly, the battery module 20 according to this embodiment is excellent not only in vibration resistance but also excellent in dealing with thermal stress due to using environment. Besides, since the parts do not require high tolerance grade, it is also excellent in productivity.

Further, in the battery module 20 according to this embodiment, the exterior case includes the lower lid 22 having three faces of the front face, the bottom face, and the rear face and the upper lid 21 having three faces of the left side face, the upper face, and the right side face, and it is formed in an approximate hexahedron by coupling the lower lid 22 and the upper lid 21. Therefore, when two assembled battery blocks 11, each being composed of six assembled batteries 2, are arranged and fixed on the lower lid 22, since the left side face and the right side face are opened, workability (assembling easiness) can be improved. When the lower lid 22 and the upper lid 21 are coupled to each other, visual confirmation can be performed from the front face and rear face directions, safety can be improved. Since each of the upper lid 21 and the lower lid 22 has three faces, manufacturing cost of the exterior case according to the embodiment can be reduced as compared with the conventional exterior case having a box structure with five faces.

In the battery module 20 according to this embodiment, since the circular holes for taking out the positive electrode power cable 81 and the negative electrode power cable 82 are formed in the front face of the exterior case (the lower lid base 61) and the positive electrode power cable 81 and the negative electrode power cable 82 are fixed to the lower lid 22 before the assembled block 11 is accommodated and fixed, erroneous wire connection can be prevented and safe electric connection can be performed. Since the intake opening 26 and the outlet opening 27 are respectively formed in the front face and the rear face of the exterior case (the lower lid base 61) and the duct formation portion is formed on the reinforcing louver 65, formation of the cooling system is completed by arranging and fixing the assembled blocks 11 on the lower lid 22 and connecting the upper lid 21 to the lower lid 22, so that assembling easiness can be improved.

In the battery module 20 according to the this embodiment, since the lower lid 22 and the upper lid 21 are fixed to each other such that the lower lid flange portions 68 extending from the bottom face portion of the lower lid 22 toward the both lateral sides correspond to the upper lid flange portions 86 extending from the left and right side faces of the upper lid 21 toward the both lateral sides, positioning of the upper lid 21 and the lower lid 22 can be made easily by the lower lid flange portions 68 and the upper lid flange portions 86, so that workability is improved and, since a flat face (an approximately horizontal face) is formed by the lower lid flange portions 68 and the upper lid flange portions 86, screw-fastening is made easy.

In the battery module 20 according to this embodiment, since the lower lid flange portions 68 are positioned above he bottom face of the lower lid 22, the coupling portion of the lower lid flange portions 68 and the upper lid flange portions 86 is floated from the placement face of the exterior case, and the lower lid flange portions 68 do not contact with the placement face of the exterior case, breaking of the coupling portion due to vibrations or the like is prevented so that reliability of the coupling portion is improved. Since the bent rib 69 bent upwardly is formed at the end portion of the lower lid flange portion 68, an amount of material to be used can be reduced by reducing the plate thickness of the lower lid base 61, so that the weight and the cost of the lower lid 22 can b be lowered, and since the bent rib 69 is bent upwardly, positioning conducted when the lower lid 22 and the upper lid 21 are coupled to each other is made easy so that workability is improved. Further, end portions of the left side face, the upper face, and the right side face of the upper lid 21 are narrowed down on the front face and rear face portions of the lower lid 22, structural strength is increased and distortion of the upper lid 21 per se is reduced. Simultaneously therewith, since the strength is increased, the amount of material to be used can be decreased by reducing the plate thickness of the upper lid 21, and the weight and cost of the upper lid 21 can be reduced.

Further, in the battery module 20 according to this embodiment, since the battery module 20 is constituted by arranging two assembled battery blocks 11 in parallel and accommodating and fixing them in the exterior case, assembling easiness of the battery module 20 is considerably improved. Besides, since the block reinforcing plates 5 are arranged above the assembled battery block 11 in parallel with the block bases 3, 4, a structure which can endure large impacts in a vertical direction and a horizontal direction and which is adopted to a power source for an automobile can be obtained.

Furthermore, in the battery module 20 according to this embodiment, since the lower lid 22 forms the duct 75 for each assembled battery block 11 and the cooling air circulating path 15 is formed so as to correspond to a portion between adjacent unit cells 1 constituting the assembled battery 2, such a structure that cooling air flows upwardly between adjacent unit cells 1 can be obtained, and since a temperature of cooling air flowing in the duct 75 is constant, air with a constant temperature strikes on respective unit cells 1 so that almost constant cooling condition can be obtained. A considerably efficient structure where a cooling system is completed by only forming the assembled battery block 11 fixed with assembled batteries 2 with the same shape having the louver function (the arch-shaped louver 31 and the cross-shaped louver 32) included therein on the lower lid 22 having the ducts 75 and the ventilation holes 76 can be obtained, where it is unnecessary to change a louver shape for each unit cell 1 and simple assembling is made possible. Since the opening areas of the ventilation holes 76 on the introduction side of cooling are large while the opening areas of the ventilation holes 76 become smaller according to approaching to the discharge side, an approximate half of the ventilation hole nearest the introduction side is covered with the shielding louver 77, and the ventilation hole nearest the discharge side has approximately the same opening area as that of the ventilation hole nearest the introduction side, temperatures of the unit cells 1 can be kept approximately constant.

Incidentally, in this embodiment, a sheet shaped elastic body was shown as an elastic body, however, an elastic adhesive tape having adhesive on both surfaces thereof or on one surface thereof may be used. For example, in a case of the elastic adhesive tape having adhesive on one surface, the two block bases 3, 4 are disposed in parallel to be opposed to each other, the elastic adhesive tape is held to the block bases 3, 4 by removing a peel-off sheet of the elastic adhesive tape disposed in advance at the side of the block bases 3, 4, and then the assembled batteries 2 are disposed to fix them to the block bases 3, 4 with fixing screws 8. Further, in place of the elastic sheet 9, an elastic adhesive substance which adheres and solidifies may be used. In this case, after the elastic adhesive substance is coated on the block bases 3, 4, the assembled batteries 2 are disposed to fix them to the block bases 3, 4 with fixing screws 8.

Further, the assembled battery block 11 constituted by the six assembled batteries 2 were shown in this embodiment, however, a secondary battery having higher voltage can be obtained by changing lengths of the block bases 3, 4, the block reinforcing plates 5 and the elastic sheet 9.

Furthermore, a lithium ion secondary battery was shown as a unit cell in this embodiment, however, the present invention is not limited to this. The present invention is applicable, for example, to a secondary battery capable of charging and discharging such as nickel hydrogen battery or the like and can be used appropriately to a mobile electric power source where these batteries are used as a main power source or a hybrid power source such as a power source for an electric vehicle.

Not only the number of the assembled batteries 2 but also that of the assembled battery blocks 11 can be changed for assembly, and besides, a unit cell fallen into an abnormal state in an operating time can be replaced per unit of the assembled battery 2. Accordingly, the battery module 20 has a large industrial value. Finally, the assembled battery 2 can be disassembled only by cutting five bus bars of the inter-unit cell bus bar 33, positive electrode bus bar 34, negative electrode bus bar 35, those inserted into one frame 12, and the two inter-unit cell bus bars inserted into another frame 12. Accordingly, the battery module 20 (assembled battery 2) is also excellent in view of recycling.

INDUSTRIAL APPLICABILITY

As stated above, since the present invention provides the secondary battery module which is excellent in vibration resistance, it contributes to manufacturing and marketing of secondary battery modules, so that industrial applicability can be achieved.

What is claimed is:

1. A secondary battery module comprising,
a case; and
a battery block which is constituted by disposing adjacently a plurality of unit cell groups each having a plurality of unit cells, and each of the plurality of unit cells being held by frames and which is accommodated to be fixed inside the case,
wherein the battery block is constituted such that
(i) the plurality of unit cell groups disposed adjacently is held and fixed vertically and horizontally at four corners formed along a disposed direction of the plurality of unit cell groups by two channel shaped block bases which have an approximately L shaped section and which support a lower portion of the frames of the plurality of unit cell groups disposed adjacently and two channel shaped block reinforcing plates which have an approximately L shaped section and which hold an upper portion of the frames of the plurality of unit cell groups disposed adjacently, and
(ii) the battery block is accommodated to be fixed inside the case such that the channel shaped block reinforcing plates are fixed inside the case, and
wherein an elastic body is laid between the block bases and the lower portion of the frames of the plurality of unit cell groups disposed adjacently along the disposed direction of the plurality of unit cell groups.

2. A secondary battery module according to claim 1, wherein a surface of the elastic body has adhesion.

3. A secondary battery module according to claim 1, wherein the elastic body is an elastic adhesive substance which adhered and solidified between the block bases and the unit cell groups.

4. A secondary battery module according to claim 1, wherein the block bases and the block reinforcing plates are an angle member.

5. A secondary battery module according to claim 1, wherein the battery block is accommodated in an exterior case formed in an approximately hexahedral shape, and wherein the exterior case is formed by combining a lower lid having a front face, a bottom face and a back face, and an upper lid having a left side face, an upper face and a right side face.

6. A secondary battery module according to claim 5, wherein the lower lid and the upper lid are fixed to each other such that first flange portions extending from a bottom face portion of the lower lid laterally correspond to second flange portions extending from left and right side faces of the upper lid laterally.

7. A secondary battery module according to claim 6, wherein the first flange portions are positioned above the bottom face of the lower lid.

8. A secondary battery module according to claim 6, wherein end portions of the first flange portions are bent upwardly.

9. A secondary battery module according to claim 5, wherein end portions of the left side face, the upper face, and the right side face of the upper lid are drawn at the sides of the front face and the back face of the lower lid.

* * * * *